United States Patent [19]

Wells et al.

[11] Patent Number: 4,492,019
[45] Date of Patent: Jan. 8, 1985

[54] METHOD OF FORMING AN AXLE

[75] Inventors: Calvin G. Wells; Steven B. Szabo, both of Warren, Mich.

[73] Assignee: Rockwell International Corporation, Pittsburgh, Pa.

[21] Appl. No.: 509,580

[22] Filed: Jun. 30, 1983

[51] Int. Cl.³ .............................................. B23P 11/02
[52] U.S. Cl. .................................. 29/447; 29/460; 29/525; 29/557; 152/417; 228/112; 228/82
[58] Field of Search ............... 29/447, 446, 460, 525, 29/DIG. 35, 557; 228/182, 112; 152/417; 301/124 R

[56] References Cited

U.S. PATENT DOCUMENTS

| | | | |
|---|---|---|---|
| 1,112,596 | 10/1914 | Burggraf, Jr. | 152/417 |
| 2,090,089 | 8/1937 | Wiegand | 152/417 |
| 3,535,002 | 10/1970 | Stamm | 228/112 X |
| 3,544,120 | 12/1970 | Stamm | 228/112 X |
| 3,591,907 | 7/1971 | MacMunn | 29/447 X |
| 3,626,568 | 12/1971 | Silverstein et al. | 29/DIG. 35 X |
| 3,705,614 | 12/1972 | Juttner | 152/417 |

Primary Examiner—Charlie T. Moon

[57] ABSTRACT

A method of forming an axle with hollow spindles which are each capable of supporting a rotatable hub having a wheel and tire mounted thereon. Each hub would include an intermediate cavity which is sealed to define with a wall of the spindle a reservoir for inflation air for the tire. Inflation air is supplied to the spindle at a region axially inwardly of the hub at a predetermined circumferential location thereon. The steps of forming include providing each of the spindles with an outer cylindrical surface at the region. Air passages are formed in the wall of the spindles communicating the intermediate cavity of the hub with a radially extending passage at the outer cylindrical surface. Each of the spindles is welded respectively to the opposite ends of the central portion of the axle. A pair of collar elements are formed with each collar element having an inner cylindrical surface matching the outer cylindrical surface of the spindle and a coupling passage and fitting for mating with the supply of inflation air. Each of the collar elements is respectively installed on the outer cylindrical surface of each of the spindles with the radially extending passage and the coupling passage being connected by a circumferential groove which has been formed in either the outer or inner cylindrical surface and the fitting being positioned at the predetermined circumferential location for mating with the supply of inflation air.

6 Claims, 6 Drawing Figures

METHOD OF FORMING AN AXLE

BACKGROUND OF THE INVENTION

1. Field of the Invention.

This invention relates to a method of forming an axle and, more specifically, to such an axle which can be utilized with a central tire inflation system.

2. Description of the Prior Art.

While there have heretofore been a number of methods employed for providing central tire inflation systems, there remains the problem of providing a proper means for providing the inflation air from a fixed source of inflation air on the vehicle to a rotating wheel and tire configuration at the ends of the axles. It has been found that the hub element of such a wheel and tire configuration can be installed on a rigid spindle portion of the axle or axle housing in a manner which will provide a sealed intermediate cavity between the inner and outer bearing elements for the hub. With the intermediate cavity serving as a reservoir for the inflation air for the tire or tires to be mounted thereon, the spindle supporting the hub must be provided passage means for allowing air to be transmitted from the central tire inflation system to the reservoir within the hub.

Although U.S. Pat. No. 3,705,614 discloses a central tire inflation system employing a region intermediate of the bearings of the hub for receipt of the inflation air, the method employed for sealing and transmitting the air is different from that mentioned hereinabove. Nevertheless, the air passages provided in the spindle portion of the axle disclosed therein do adequately and properly allow air from a central tire inflation system to be supplied to this region. However, the type of spindle employed on the axle disclosed in U.S. Pat. No. 3,705,614 is one which includes a large flange portion to be bolted to a flange on a central portion of the axle housing. The bolt holes in the spindle flange can be used as pilot holes when forming the air passages to insure that an air fitting inwardly of the hub is at a predetermined circumferential location to mate with a supply line from the central tire inflation system. While this configuration is acceptable for some axle installations, it is not uncommon for such a bolted flange arrangement to be undesirable and unacceptable because of both weight and space considerations. Accordingly, in such installations, the spindles are initially formed hollow and friction welded or butt welded to a center portion of the axle.

However, in any such axle configuration wherein the spindles are friction welded to a center portion to form the axle, it has been found that the eventual circumferential location of the spindle relative to the center portion is unpredictable. A similar problem of manufacturing control could exist even if the spindles are butt welded to the center portion. Accordingly, in one prior art axle, the inflation air passageways are formed after the spindles are secured to the center portion in order to insure that the inwardly positioned air fitting on the spindle will properly mate with the central tire inflation system. Formation in this manner has required critical drilling of axial passageways and produced stress risers in the axle spindle when drilling the primary radial passageway. As a result, it was not uncommon for axles being formed in this manner to be relatively expensive and subject to quality control problems which could result in some of the axles being rejected as unqualified for use.

Accordingly, there remains a need for providing an axle which is formed by the welding of spindle portions to a center portion and includes passageways therein which can be reasonably formed in a manner which will insure proper mating with a central tire inflation system.

SUMMARY OF THE INVENTION

It is therefore an object of this invention to provide an axle which is formed by welding spindles to a center portion of the axle which spindles include air passages for a central tire inflation system and an air fitting axially inwardly of the hub at a proper circumferential location on the spindle for mating with a central tire inflation system.

These and other objects of the invention are provided by a preferred method including a method of forming an axle of the type which includes a central portion with a pair of hollow spindles welded at opposite ends thereof. Each of the spindles is capable of receiving a rotatable hub thereon for support of a wheel and tire. The hub includes an intermediate cavity which is sealed to define, with a wall of the spindle, a reservoir for inflation air for the tire. The spindle is capable of being coupled at a region axially inwardly of the hub at a predetermined circumferential location thereon to a central tire inflation system to provide the inflation air for the reservoir. The method includes the steps of providing a central portion of the axle and a pair of spindles with each spindle having a cylindrical outer surface at the region. An axially extending passage in the wall of the spindle is formed beginning at an interior surface thereof and terminating in alignment with the intermediate cavity of the hub. A first radially extending passage is formed from the cylindrical outer surface to terminate at the axially extending passage. A second radially extending passage in the wall of the spindle is formed to connect the axially extending passage with the reservoir. The axially extending passage is sealed at the interior surface. Each of the spindles is respectively welded to opposite ends of the central portion. A pair of collar elements are formed with each collar element having a cylindrical inner surface matching the cylindrical outer surface of the spindle, a coupling passage and a fitting for mating with the central tire inflation system. A circumferential groove is formed in at least one of the cylindrical outer surface of the spindle intersecting the first radially extending passage and the cylindrical inner surface of the collar element intersecting the coupling passage. Each of the collar elements is respectively installed on the cylindrical outer surface of each of the spindles with the first radially extending passage and the coupling passage being connected by the circumferential groove and the fitting being positioned at the predetermined circumferential location for mating with the central tire inflation system.

DETAILED DESCRIPTION OF THE PREFERRED EMBODIMENT

Figure 1:
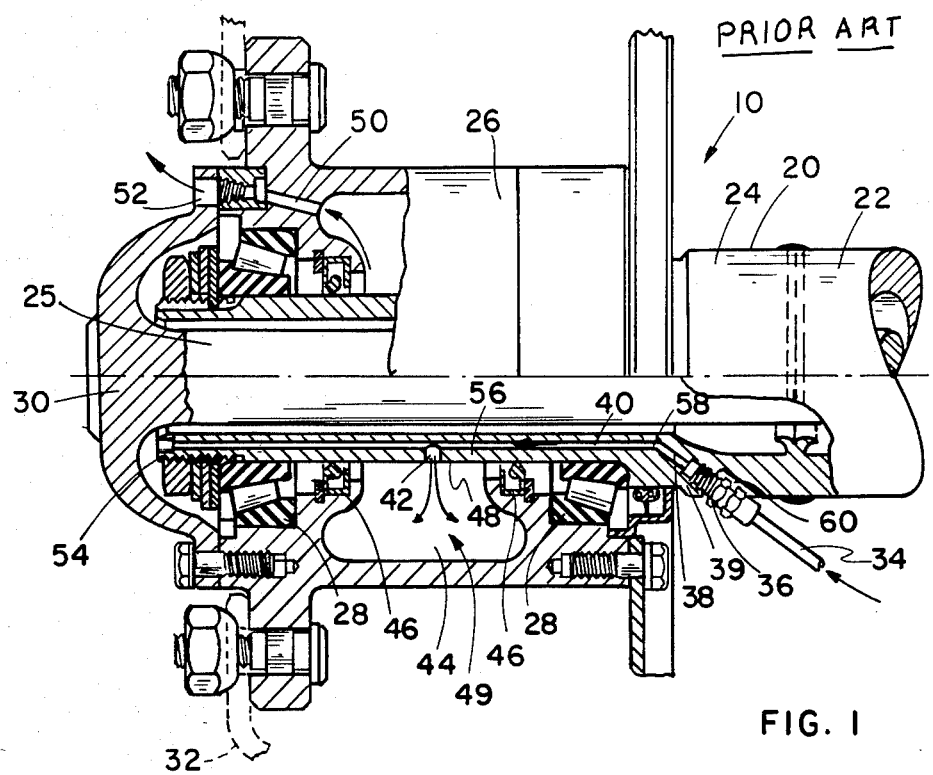
FIG. 1 is a fragmentary elevational view, partially in section, of a prior art axle for use with a central tire inflation system.

As seen in FIG. 1, a prior art drive axle configuration 10 has heretofore been provided which includes features for use with a central tire inflation system for automatic inflation of the vehicle tires. Although a drive axle configuration 10 is being shown, it should be clear that the primary features described would be applicable for and similarly employed in a trailer axle configuration. Although only one end is included in FIG. 1 for purposes of demonstration, the prior art drive axle configuration 10 includes an axle housing 20 which has a central portion 22 with a pair of spindles 24 welded thereon. The spindle 24 is shown to be friction welded on the central portion 22 even though a similar axle might be formed by butt welding. To provide power to the wheels, a drive axle 25 extends through the housing 20 from a differential (not shown). A hub 26 is mounted for rotation on the spindle 24 of the axle housing 20 at a pair of bearings 28. The hub 26 is coupled to a mushroom head 30 of the drive axle 25 to cause rotation of the hub 26 therewith. The hub 26 supports a wheel 32 which could be designed to support one or more tires (not shown) thereon.

In order for a central tire inflation system to provide inflation air for the tires, a means must be provided for supplying the air to the tires which are rotating about the axle housing 20. In the prior art axle configuration 10, air is supplied from a fixed central source located on the vehicle through a line 34 to a fitting 36 which is installed on the spindle 24 of the axle housing 20. The circumferential location of the fitting 36 on the spindle 24 is predetermined according to the drive axle design to facilitate a proper mating with the air line 34. Although not shown in FIG. 1, such axles 10 have a number of other components mounted thereon such as brakes and suspensions which present spacing design considerations and require that the air line 34 be specifically directed to the spindle 24 at a predetermined circumferential location thereon.

From the inflation air fitting 36, a generally radially extending passage 38 in a transition wall 39 of the spindle 24 intersects an axially extending passage 40. A second radially extending passage 42 also intersects the axially extending passage 40 to allow air to communicate with a cavity 44 in the hub 26 which is located between the bearings 28. The cavity 44 is sealed at a pair of circumferential seals 46 and defines, with an exterior surface 48 of the spindle 24, a reservoir 49 for the receipt of inflation air from the central tire inflation system. A discharge passage 50 is formed in the hub 26 to supply a fitting 52 which is coupled by an air line to the tire or tires mounted on the wheel 32.

As thus described, the prior art drive axle configuration 10 is quite capable of and includes satisfactory features for transmitting inflation air from a fixed source to the rotating tires mounted on the wheel 32. However, the prior art axle configuration 10 includes features which cause the axle housing 20 to be relatively expensive to provide and subject to quality control problems. Additionally, the final configuration could result in stress risers in the axle spindle 24 tending to decrease its overall strength. These features are present because of the type of spindle being employed and the methods utilized to produce the air passages therein.

As mentioned hereinabove, with axle configurations which employ spindles which are friction welded or butt welded to a center portion thereof, there is a concern that the air fitting 36 which is to mate with the supply line 34 from the central tire inflation system will be at the proper circumferential location about the spindle 24. Accordingly, this prior art drive axle configuration is formed by first welding the spindles 24 to the center portion 22. With the spindles 24 securely fixed to the center portion 22, the axial passage 40 is formed by rifle drilling from the exterior end 54 of the spindle 24 to a depth which includes almost the entire length of the cylindrical wall 56 of the spindle 24. Rifle drilling is a relatively expensive process and the cost is directly proportional to the length of such drilling. Additionally, attempting to drill such lengths is difficult and control of the circumferential location of the inward end 58 is quite critical.

After the axially extending passage 40 is formed, the passage opening at the end 54 of the spindle 24 is employed as a pilot to provide the other passages 38 and 42. Prior to formation of the passage 38, a recess 60 must be provided in the transition wall 39 in order to have a proper surface for drilling of the passage 38. Reducing the cross-section of the transition wall 39 at the recess 60 could produce stress risers in the spindle 24 tending to decrease its overall strength. Although the length of passage 38 is not very long, if the end 58 of the axially extending passage 40 is not properly located, mating of passage 38 and 40 would not result. If this were to occur, the entire axle housing 20 would have to be discarded as unqualified for use. On the other hand, assuming successful mating of passages 38 and 42 with the axially extending passage 40, a steel plug is press fitted in the end of passage 40 at the end 54 of spindle 24 and sealed to insure that inflation air is properly directed to the reservoir 49.

Figure 2:
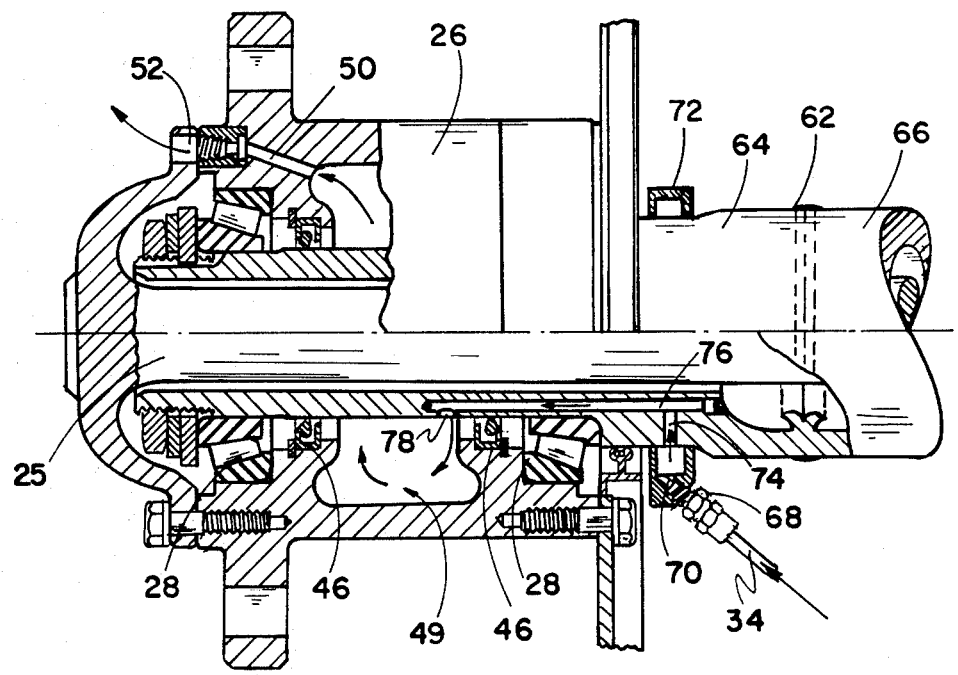
FIG. 2 is a fragmentary elevational view, partially in section, of the preferred axle including various features of the invention.

As seen in FIG. 2, a preferred drive axle housing 62 can be employed with an identical drive axle 25 and hub 26 to provide the same central tire inflation feature as the prior art drive axle housing 20. However, the housing 62 does not include any stress risers, is less expensive to provide and is not subject to the quality control problems as found in the prior art configuration. The housing 62 again includes a pair of spindles 64 which are shown to be friction welded to a central portion 66. Again, the spindles 64 could alternatively be butt welded to the central portion 66. Supply line 34 again provides inflation air from the central tire inflation system to the identical circumferential location on the spindle 64 as on the spindle 24 for the prior art housing 20. The line 34 is coupled to a fitting 68 which communicates with a coupling passage 70 in a collar element 72 mounted around the spindle 64. A radially extending passage 74 directs the air to an axially extending passage 76 which in turn supplies the air to a second radially extending passage 78. However, it will be noted that the axially extending passage 76 is significantly shorter than the axially extending passage 40 of the prior art spindle 24.

Various features of the preferred drive axle housing 62 will become apparent after a detailed explanation of the preferred method for forming the housing 62. In both FIGS. 3 through 6 and the explanation provided hereinbelow, it will be noted that various conventional steps in the formation of an axle or axle housing have been eliminated as well known in the axle forming art and outside the scope of the present invention. Such steps would include machining and hardening bearing surfaces and forming threads on the end of the spindle for bearing retaining means.

Figure 3:
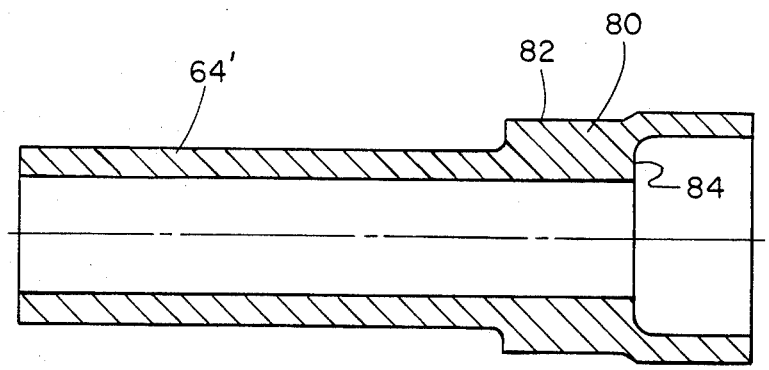
FIG. 3 is a sectional elevational view of the preferred spindle prior to installation on a center portion of the axle.

As seen in FIG. 3, a blank spindle 64' is longer than the prior art spindle 24. Since the blank spindle 64' is not initially friction welded to the center portion 66, some of the additional length will be provided for the friction welding process. However, the blank spindle 64' would be longer than a blank spindle of the prior art axle housing 20 since additional material has been provided in the area of a transition wall 80. The transition wall 80 is provided an outside cylindrical surface 82 and a radially extending interior surface 84.

Figure 4:
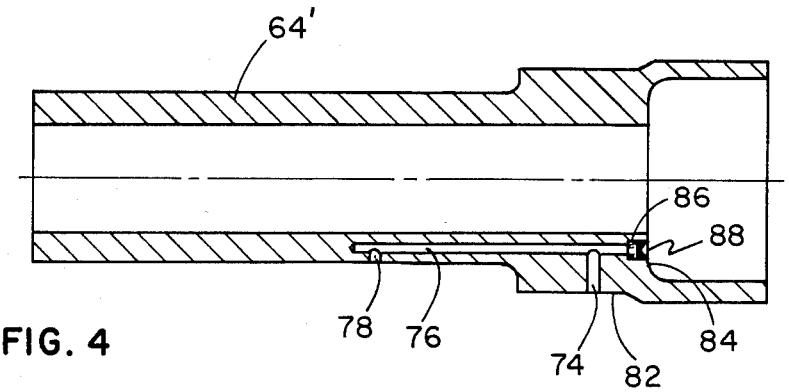
FIG. 4 is a view of the spindle as seen in FIG. 3 after formation of the preferred air passages for a central tire inflation system.

As seen in FIG. 4, the blank spindle 64' is provided the passages 74, 76 and 78 prior to being installed on the central portion 66. Specifically, the axially extending passage 76 is rifle drilled from the interior surface 84 to extend axially to a region aligned with the cavity 44 of the hub 26. It can be seen that the axially extending passage 76 is significantly shorter and, therefore, less expensive to provide than the axially extending passage 40 of the prior art axle housing 20. Using the end of the passage 76 at the interior surface 84 as a pilot, the passages 74 and 78 are then drilled to intersect the axially extending passage 76. Because of the shorter distances involved, there is much less likelihood of an improper intersection of the passages and therefore less likelihood of experiencing any quality control problems. Additionally, the radially extending passage 74 can more conveniently be provided since the cylindrical outer surface 82 is perpendicular to the passage 74 and is therefore capable of being readily drilled without a recess 60 as was required for the prior art housing 20. After the passages 74, 76 and 78 are formed, a steel plug 86 is press fit into the end of passage 76 at the interior wall 84 and the end of the plug 86 is secured in place and entirely sealed by welding material at 88.

Figure 5:
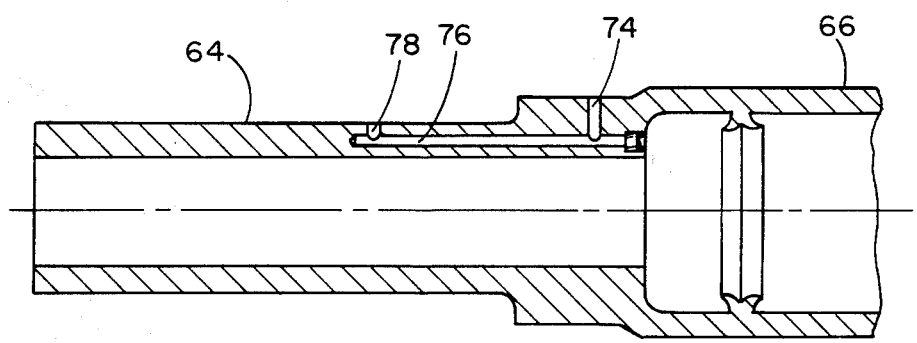
FIG. 5 is a sectional elevational view of the spindle as seen in FIG. 4 after being installed on a center portion of the preferred axle.

With the blank spindle 64' so formed, the spindle is then friction welded or butt welded to the center portion 66 as seen in FIG. 5. To provide the housing 62 with the same overall length as the housing 20, the center portion 66 will be shorter than the center portion 22 because of the addition length of the spindles 64. It will be noted that the finished spindle 64 when welded to the center portion 66 could be circumferentially oriented relative thereto in any position so that there is no way to reasonably predetermine or predict the circumferential location of the passages 74, 76 and 78.

Figure 6:
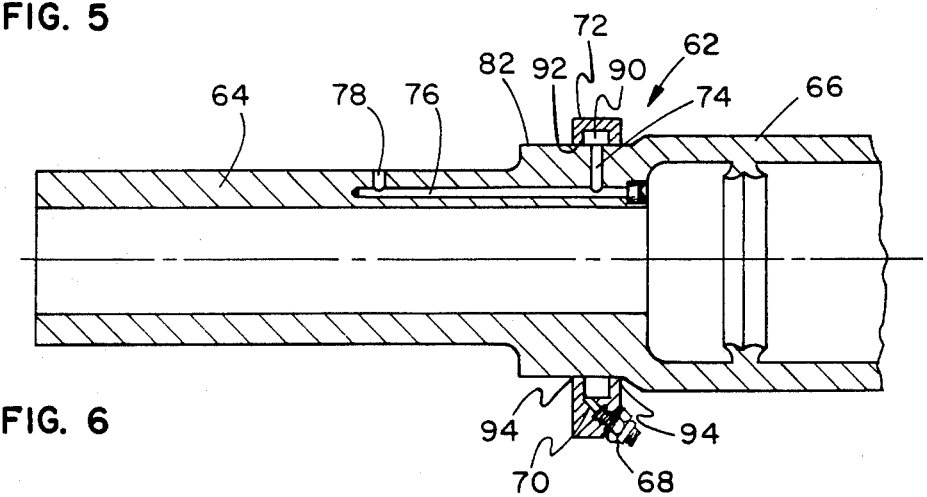
FIG. 6 is a sectional elevational view of the completed axle including various features of the invention.

As seen in FIG. 6, in order to insure that the preferred axle housing 62 includes the fitting 68 which is in a proper circumferential location to mate with the air supply line 34, the fitting 68 is installed on a collar element 72. The collar element 72 has an enlarged area thereon to accommodate the fitting 68 and a coupling passage 70 therein. More significantly, however, the collar 72 includes a circumferential groove 90 which is formed in an inner cylindrical surface 92 of the collar element 72 to intersect with the coupling passage 70. The inner cylindrical surface 92 is sized to be properly fitted about the outer cylindrical surface 82 of the spindle 64. Accordingly, when the collar element 72 is properly mounted on the outer cylindrical surface 82 of the spindle 64, the cylindrical groove 90 will be aligned with the axial passage 74 and the fitting 68 will be circumferentially positioned at the desired location for mating with the supply line 34. Specifically, to properly mount the collar element 72 on the outer cylindrical surface 82, the collar element 72 is heated to expand, positioned in the proper circumferential location, and allowed to cool for shrink fitting on the outer cylindrical surface 82. It should now be noted from FIG. 6, that the location of the passages 74, 76 and 78 are not identical to those shown in FIG. 2. In fact, the location of the passages in FIG. 2 was selected for demonstration purposes only and it should now be clear that the passages 74, 76 and 78 might be at any circumferential location relative to the remainder of the preferred axle housing 62 while still providing a means for supplying the inflation air to the reservoir 45. Air would be supplied through the line 34 to fitting 68 and the coupling passage 70 and then around the circumferential groove 90 to the axially extending passage 74 independent of its specific circumferential location on the housing 62.

Although shrink fitting of the collar element 72 on the cylindrical outer surface 82 should provide sufficient sealing contact therebetween to prevent any loss of inflation air, to insure a proper sealing, it might be necessary to perform more critical machining operations at the outer surface 82 and the inner surface 92. However, to eliminate the cost of additional machining, a sealing material is used. A flexible anaerobic polyacrylate can be applied at the edges 94 of the collar 72 after installation on the outer surface 82. The sealant cures in the absense of air at room temperature and should fill surface imperfections and gaps up to .010 of an inch. However, it is felt that the best way to apply the sealant would be from within the collar 72. Accordingly, after the collar 72 is installed, prior to release of the housing 62 for other steps of manufacturing, a sealing clamp is temporarily installed over the outlet of passage 78. The sealant is then poured into the fitting 68 until the passages 70, 74, 76, 78 and the groove 90 are filled. Pressurized air is then directed to the fitting 68 to force the sealant into any cracks or gaps. With the release of the air and removal of excess sealant, remaining sealant is allowed to cure to insure that there will be no leakage of inflation air during operation of the housing 62.

It also should be noted that the preferred axle housing 62 is formed in a manner which eliminates the recess 60 of the prior art housing 20 and, additionally, further strengthens the entire housing 62 by a simple lengthening of the spindle 62 and shortening of the central portion 66 while adding material in the transition wall 80.

Although the circumferential groove 90 is shown in the preferred embodiment to be formed in the collar element 72, it should be clear that a similar configuration could be provided by including a circumferential groove in the cylindrical outer surface 82 which intersects the radially extending passage 74. In such a configuration, the collar element would simply include the fitting 68 and a larger coupling passage which passage would be axially positioned on the surface 82 to intersect the groove therein. Clearly, any number of alternatives could be made to the preferred embodiment without departing from the invention as claimed.

I claim:

1. A method of forming an axle of the type which includes a central portion with a pair of hollow spindles welded at opposite ends thereof, each of said spindles being capable of receiving a rotatable hub thereon for support of a wheel and tire, said hub including an intermediate cavity which is sealed to define with a wall of said spindle a reservoir for inflation air for said tire, said spindle being capable of being coupled at a region axially inwardly of said hub at a predetermined circumferential location thereon to a central tire inflation system to provide said inflation air for said reservoir, said method comprising the steps of:

providing a central portion of said axle;

providing a pair of spindles with each said spindle having a cylindrical outer surface at said region;

forming an axially extending passage in said wall of said spindle beginning at an interior surface thereof and terminating in alignment with said intermediate cavity of said hub;

forming a first radially extending passage from said cylindrical outer surface to terminate at said axially extending passage;

forming a second radially extending passage in said wall of said spindle to connect said axially extending passage with said reservoir;

sealing said axially extending passage at said interior surface;

welding each of said spindles respectively to said opposite ends of said central portion;

forming a pair of collar elements, each said collar element having a cylindrical inner surface matching said cylindrical outer surface of said spindle, a coupling passage and a fitting for mating with said central tire inflation system;

forming a circumferential groove in at least one of said cylindrical outer surface of said spindle intersecting said first radially extending passage and said cylindrical inner surface of said collar element intersecting said coupling passage; and installing each of said collar elements respectively on said cylindrical outer surface of each of said spindles with said first radially extending passage and said coupling passage being connected by said circumferential groove and said fitting being positioned at said predetermined circumferential location for mating with said central tire inflation system.

2. The method of forming an axle as set forth in claim 1, wherein said step of forming an axially extending passage in said wall of said spindle is accomplished by rifle drilling.

3. The method of forming an axle as set forth in claim 1, wherein said sealing said axially extending passage at said interior surface includes installing a plug in said axially extending passage and welding an outer end thereof to insure it is sealed against loss of said inflation air.

4. The method of forming an axle as set forth in claim 1, wherein said installing each of said collar elements respectively on said cylindrical outer surface of each of said spindles includes the steps of heating said collar element, positioning said collar element over said cylindrical outer surface and allowing said collar element to cool and shrink fit on said spindle.

5. The method forming an axle as set forth in claim 4, including the additional step of applying a liquid sealing material at the mating of said collar element to said cylindrical outer surface to prevent a loss of said inflation air between said collar element and said cylindrical outer surface.

6. The method of forming an axle as set forth in claim 5, wherein said applying said liquid sealing material includes installing a temporary closure over an outlet of said second radially extending passage; pouring said liquid sealing material into said fitting, said coupling passage, said circumferential groove, said first radially extending passage, said axially extending passage and said second radially extending passage; applying air pressure to said fitting; releasing said air pressure; removing an excessive quantity of said liquid sealing material; and removing said temporary closure.

* * * * *